Patented Apr. 27, 1954

2,676,944

UNITED STATES PATENT OFFICE 2,676,944

RUBBER PROCESSING IN THE PRESENCE OF CARBON BLACK AND AN ORGANIC PEROXIDE

Kenneth W. Doak, Bloomfield, N. J., assignor to United States Rubber Company, New York, N. Y., a corporation of New Jersey No Drawing. Application April 27, 1951, Serial No. 223,460

17 Claims. (Cl. 260—41.5)

This invention relates to improvements in the technique of processing high carbon black-rubber mixes prior to vulcanization thereof.

The technique of processing rubber mixed with high amounts of reinforcing carbon black, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained by incorporating uniformly in the rubber a relatively large amount of reinforcing carbon black, for example, at least 25 parts, and preferably, in the case of tire treads, at least 40 parts, by weight, of carbon black per 100 parts by weight of rubber, and then subjecting the uniformly mixed masterbatch to a special heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration will be found suitable for most purposes, particularly within the preferred temperature range.

An object of the present invention is to provide new chemical promoters for the processing of mixtures of rubber and reinforcing carbon black described in U. S. P. 2,118,601, and referred to herein as low-hysteresis processing, whereby to obtain tread stocks of high electrical resistance and low torsional hysteresis. A further object is to provide substantial decreases in the time required for the low-hysteresis processing, by the use of the herein disclosed chemicals, with consequent increase in the capacity and output of equipment.

I have discovered that the time required for low-hysteresis processing of the type disclosed in the above-mentioned Gerke et al. patent can be substantially decreased, and the temperature required in such processing can also be substantially lowered, by incorporating an organic peroxide in the mixture of rubber and carbon black, prior to the low-hysteresis processing treatment. Thus, with the peroxide present, it is possible to obtain the benefits of low-hysteresis processing to a given extent at a lower temperature, or in a shorter time, or both at lower temperature and in shorter time. As a result, the productivity of the equipment is greatly increased.

In practicing my invention, I typically incorporate a relatively small amount of an organic peroxide intimately and uniformly into the well-mixed blend of rubber and carbon black at a temperature well below any temperature at which the organic peroxide is thermally decomposed to any substantial extent. Thereafter, I subject the resulting mixture to a temperature sufficiently elevated to thermally decompose the organic peroxide in the blend but insufficiently elevated to materially injure the rubber. This treatment is typically carried out at temperatures ranging from 250° F. to 325° F. and is preferably effected by masticating the mixture at such temperatures and for such time as to bring about particulate dispersion of the carbon black throughout the mass without, however, seriously deteriorating the rubber. Thereafter, the vulcanizing and other desired ingredients are incorporated and the resulting mixture is thereafter shaped and vulcanized.

The organic peroxides which are operable in my invention include both those containing the hydrogen peroxy group —O—O—H and those in which both oxygen atoms of the peroxy group (—O—O—) are joined to organic radicals. Said radicals may be selected from the class consisting of alkyl, cycloalkyl, aryl, aralkyl, acyl, alkenyl, cycloalkenyl, and such groups which have substituent groups which do not interfere with the desired result, such as alkyl, cycloalkyl, aryl, aralkyl, halogen, hydroxyl, alkoxy, aryloxy, carboxyl and peroxy groups. In the case of peroxides which contain the hydrogen peroxy group, the —O—O—H group can be joined to any of the same organic radicals as are enumerated above for those peroxides wherein both oxygen atoms are joined to organic radicals. The acyl groups can be derived from aliphatic saturated monocarboxylic or polycarboxylic acids, or from aromatic monocarboxylic or polycarboxylic acids. I can use a mixed compound in which one of the oxygens of the peroxy group is joined to a hydrocarbon group such as alkyl, while the other is joined to an acyl group, an example of such a compound being tertiary-butyl peroxybenzoate. I can also use a peroxide which is a diester of a diperoxy-dicarboxylic acid, an example of such a peroxide being di-tertiary-butyl diperoxyphthalate

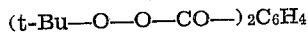
$(t\text{-Bu}\text{—O}\text{—O}\text{—CO}\text{—})_2C_6H_4$

The compound 2,2-bis(tertiary-butylperoxy)butane is an example of a di-alkylperoxy compound which can be used in my invention.

Other specific examples of the peroxides used in my invention are: t-butyl hydrogen peroxide, t-butyl peroxide, alpha,alpha-dimethylbenzyl hydrogen peroxide (commonly known as "cumene hydroperoxide"), p-(t-butyl)-alpha, alpha-dimethylbenzyl hydrogen peroxide, p-methyl-alpha, alpha-dimethylbenzyl hydrogen peroxide, isopropyl-alpha, alpha-dimethylbenzyl hydrogen peroxide, alpha-tetralyl hydrogen peroxide, p-chloro-alpha, alpha-dimethylbenzyl hydrogen peroxide, p-cyclohexyl-alpha, alpha-dimethylbenzyl hydrogen peroxide, 2,4-dichloro-alpha, alpha-dimethylbenzyl hydrogen peroxide, 1-hydroxycyclohexyl hydrogen peroxide, 2-cyclohexenyl hydrogen peroxide, benzoyl peroxide, bis(o-chlorobenzoyl) peroxide, bis(2,4-dichlorobenzoyl) peroxide, bis(p-chlorobenzoyl) peroxide, anisoyl peroxide, lauroyl peroxide, peroxydisuccinic acid $(COOH\text{—}CH_2\text{—}CH_2\text{—}CO\text{—}O\text{—})_2$, bis(alpha-hydroxyheptyl) peroxide, t-butyl peroxyacetate, the OO-t-butyl half ester of peroxymaleic acid $(HOOC\text{—}CH\text{=}CH\text{—}CO\text{—}O_2\text{—}C(CH_3)_3)$ the OO-t-butyl half ester of peroxyphthalic acid. The peroxides formed by oxidation of terpene hydrocarbons, such as pinane, alpha-pinene, para-menthane, and turpentine, may also be used.

I have obtained unusually satisfactory results using peroxides which are in the class of those in which at least one oxygen of the peroxy group (—O—O—) is attached to tertiary carbon, i. e., a carbon atom to which are attached three other carbon atoms. Exemplary of such preferred peroxides are: t-butyl hydrogen peroxide, cumene hydroperoxide, t-butyl peroxybenzoate, di-t-butyl peroxyphthalate, 2,2-bis(tertiary-butylperoxy)butane, t-butyl peroxyacetate, isopropyl-alpha, alpha-dimethylbenzyl hydrogen peroxide (commonly designated as "diisopropylbenzene hydroperoxide"), and para-methyl-alpha, alpha-dimethylbenzyl hydrogen peroxide.

The amount of the organic peroxide can vary widely. Enough of the peroxide should be used to substantially decrease the time necessary to lower the hysteresis of the mixture of carbon black and rubber. The maximum amount used is determined by considerations of cost and of effectiveness in proportion to amount used. I prefer to employ an amount of the organic peroxide which contains from 0.02 to 0.40 part (by weight) of active oxygen per 100 parts of rubber (only one oxygen atom of the peroxy group being "active"). Amounts within this range are highly effective and at the same time are not prohibitively expensive. For example, amounts of t-butyl peroxybenzoate in the range from 0.25 to 5.0 parts contain from 0.02 to 0.4 part of active oxygen.

Where reference is made herein to the active oxygen content of the organic peroxide this value is employed merely as a measure of the amount of the organic peroxide used; that is, expressing the amount of peroxide in terms of its active oxygen content is tantamount to expressing it in mols of peroxide. It does not signify that oxygen is evolved upon thermal decomposition of the organic peroxide during the practice of my invention.

The organic peroxide can be added at any time during or preceding the characteristic heat treatment of the carbon black and rubber mixture wherein the hysteresis of the carbon black and rubber mixture is considerably reduced. It will be obvious to those skilled in the art that this heat treatment is carried out in the absence of vulcanizing agents. If a portion of the carbon black is incorporated after the heat treatment of the mixture containing the balance of the carbon black, the rubber and the organic peroxide, the benefits of the invention are proportionately diminished.

My invention is applicable either to natural rubber (Hevea) or to synthetic conjugated diene rubbers which can be made by polymerization, as in aqueous emulsion, of one or a mixture of butadiene-1,3 hydrocarbons, e. g., butadiene-1,3, isoprene, or piperylene, or by polymerizing a mixture of one or more of such butadiene-1,3 hydrocarbons with one or more copolymerizable compounds capable of forming rubbery copolymers with butadiene-1,3 hydrocarbons, examples of such compounds being styrene, methyl acrylate, methyl methacrylate, acrylonitrile, or vinyl-pyridine. My invention is also applicable to mixtures of natural rubber and such synthetic rubbery copolymers. Any of the known types of rubbery butadiene-styrene or isoprene-styrene copolymers can be used in the practice of my invention, such as standard GR–S and the so-called "cold" GR–S. In some cases, only a part of the rubber component is subjected to heat treatment in the presence of carbon black and the peroxide promoter, the balance of the rubber being subsequently incorporated.

My invention is particularly advantageous when applied to the processing of tire tread compositions. It will be understood that such tire tread compositions, after the heat treatment, but prior to final vulcanization, are subjected to the conventional steps of incorporating vulcanizing and other desired ingredients, followed by shaping and incorporation into the tire structure. Preferably the final tire embodies, at least as its tread portion, a vulcanized composition which has been processed in accordance with the principles of my invention.

While the invention is particularly important in relation to tire tread compositions, it is also applicable to the manufacture of any rubber products in which there are desired the qualities of high abrasion-resistance, toughness, flexibility, high electrical resistivity, low hysteresis, etc., e. g., such products as footwear outsoles, pneumatic inner tubes, hose, belting, vibration-absorbing mountings, tank linings, etc.

The reinforcing carbon blacks which are employed in my invention are well-known to those skilled in the art, and include both channel blacks and furnace blacks.

The amount of carbon black employed in practicing my invention is not critical but is usually within the range of from 25 to 100 parts per 100 parts of rubber. These figures are exclusive of any rubber or carbon black added subsequent to the heat-treating step.

The organic peroxides used in my process are characterized by having decomposition temperatures and rates such that they will be largely decomposed in 20 minutes or less at some temperature in the range from 200° to 350° F. If the organic peroxides decomposes too rapidly at temperatures below 200° F., excessive decomposition is apt to occur, particularly in factory operation, while the peroxide is being mixed with the carbon black and rubber to form the masterbatch.

I prefer to employ peroxides which are stable at temperatures substantially below 250° F. and which are substantially wholly decomposed within 20 minutes or less at a temperature in the range from 250° to 325° F., and to carry out the heat treatment of the mixtures of carbon black, rubber, and peroxide at a temperature within this range. In general, at temperatures lower than 250° F. the heat treatment is not nearly so effective and the times required are excessive. On the other hand, at temperatures much above 325° F., the peroxide may be too rapidly decomposed and injury to the rubber may occur.

The heat treatment is generally carried out for a period of time ranging from 3 to 20 minutes. Times of this order lend themselves readily to commercial operations. It will be understood by those skilled in the art that the amount of peroxide, temperature of heat treatment and duration of heat treatment will be adjusted for optimum results with the particular peroxide selected.

In a typical embodiment of my invention I subject the mixture of carbon black, rubber, and organic peroxide to hot mastication at the indicated temperature in a suitable mixing device such as a Banbury mixer or a two-roll rubber mill until particulate dispersion of the carbon black throughout the mass is attained.

Instead of heat-treating by hot mastication, I can conduct the heat treatment in a heater in which the mixture is subjected to a heated gaseous atmosphere such as hot air, steam, a mixture of air and steam, nitrogen, etc. or to a heated liquid medium in which the mixture is immersed, such as hot water. The necessity of using an autoclave to withstand the pressure developed if temperatures much above the boiling point of water at atmospheric pressure are used makes this latter method of heat treatment considerably less desirable.

When the heat treatment is carried out in a heated fluid medium, the mixture of carbon black, rubber, and peroxide is preferably exposed in the form of thin layers (½" or less) in order to obtain relatively uniform heating. Such sheets are easily obtained from a conventional rubber mill or from a calender.

In practicing my invention, conventional softeners and other ingredients which will not cause vulcanization of the rubber during the heat treatment can, if desired, be included in the initial mixture of carbon black, rubber, and peroxide. The inclusion of the usual softeners in this mixture prior to the heat treatment is often desirable in order to facilitate the initial admixture and uniform distribution of the carbon black in the rubber. Examples of softeners which can be so incorporated are oils, fatty acids (e. g., stearic acid), fatty acid soaps, and mineral rubber. I can also blend reclaimed rubber with the raw rubber which is mixed with carbon black and peroxide.

Although the vulcanizing agent incorporated after the heat treatment is usually sulfur, I can use other agents known to the art to be capable of vulcanizing rubber in the presence of carbon black.

After addition of the vulcanizing agent, together with any other desired components, the mixture is vulcanized in any known manner. I can use mold cures, air cures, ammonia cures, submarine cures, steam cures, etc. The vulcanization does not per se constitute part of my invention. It will be seen that the process of my invention comprises the following essential steps:

1. Mixing thoroughly the rubber, carbon black and organic peroxide by ordinary technique, at a relatively low temperature at which the peroxide does not substantially decompose.

2. Heat-treating the resulting mixture, either by mastication or static treatment, at a temperature at which the peroxide decomposes, and for a time sufficiently long to substantially completely decompose the peroxide.

3. Masticating or milling the mixture, either during or subsequent to the decomposition of the peroxide.

4. Incorporating vulcanizing and other ingredients. Usually these ingredients are incorporated during the mastication or milling following the heat treatment. These ingredients are of course incorporated at a temperature sufficiently low to preclude vulcanization.

5. Shaping.

6. Vulcanizing the shaped mixture.

It will be understood that the entire processing of the rubber is controlled within limits avoiding serious degradation of the rubber, it being known that either excessive milling of rubber in air or excessive heating of rubber at elevated temperatures tends to break down or degrade the rubber molecules. Rubber vulcanizates made from degraded rubber have unusually low tensile strength and poor resistance to tear. In practicing my invention, the tensile strength of the vulcanizates need not be lowered more than 10% by the heat-treating step.

The following examples illustrate the preferred methods of practicing my invention. In all instances in the examples where controls are compared, the controls were processed in exactly the same way as the compositions processed with the organic peroxide, except, of course, that the organic peroxide was not used. All parts are by weight.

EXAMPLE 1

A masterbatch is prepared by mixing together 100 parts of Hevea rubber, 50 parts of carbon black (a medium processing channel black known as "Spheron 6") and 5 parts of stearic acid. The mixing operation is carried out in the conventional manner in either a Banbury mixer or a two-roll rubber mill at temperatures of 200–250° F. To 155 parts of this masterbatch there are added 1.17 parts of the organic peroxide 2,2-dimethylbenzyl hydrogen peroxide in the form of a solution in isopropylbenzene (also known as cumene) containing 71% by weight of the peroxide. The peroxide is incorporated in the masterbatch by mixing the two together on a conventional two-roll rubber mill at a temperature between 150° and 200° F. The temperature of the mill is then raised to 300° F. and the mixture is masticated on the mill for ten minutes at that temperature. The mill is then cooled to a temperature in the range 150° to 200° F. Thereafter, two parts of pine tar, two parts of zinc oxide, one part of a conventional rubber antioxidant, one part of a vulcanization accelerator and three parts of sulfur are milled into the mixture. The completed mix is removed from the mill, placed in suitable molds and vulcanized by heating for 45 minutes under 40 lbs. steam pressure (287° F.). As a control, an identical masterbatch is prepared and subjected to all the previously described manipulative steps except that no peroxide is added to the mixture. The specific electrical resistivity (reported as the logarithm, to the base 10, of R, the resistivity in ohm-centimeters) and the torsional hysteresis (measured at 280° F.) of the vulcanizates are determined, with the following results:

|  | $Log_{10}R$ | Tors. Hyst. at 280° F. |
|---|---|---|
| Control | 7.5 | 0.165 |
| Sample prepared using 1.17 parts of cumene hydroperoxide | 11.6 | 0.084 |

From these data it can be seen that by the practice of my invention I obtain a specific electrical resistivity 10,000 times greater than that of the control, and reduce the torsional hysteresis by almost one-half.

By repeating this example but employing twice the amount of peroxide (i. e., 2.34 parts of cumene hydroperoxide), I obtained the following results:

|  | $Log_{10}R$ | Tors. Hyst. at 280° F. |
|---|---|---|
| Sample prepared using 2.34 parts cumene hydroperoxide | 13+ | 0.058 |

From these data is can be seen that by employing a larger amount of organic peroxide in the practice of my invention, I obtain a specific electrical resistivity over 300,000 times that of the control, and reduce the torsional hysteresis by almost two-thirds.

To obtain comparable results by the methods described in U. S. Patent 2,118,601 would require processing for a considerably longer time at a higher temperature. Actually, it would require that the rubber mix be processed for at least one-half hour at temperatures between 325 and 350° F., as compared to 10 minutes at 300° F. required for my process.

The products of my process, in addition to being characterized by a desirably higher electrical resistivity and lower torsional hysteresis than is shown by those produced by conventional milling and mixing operations alone, exhibit also a much higher resistance to abrasion.

The torsional hysteresis obtained by the practice of my invention will depend in some measure upon the duration of the heat-treating step, i. e., the length of time that the rubber mix containing the peroxide is masticated at 300° F. The following results are obtained by carrying out the heat treating step for less than 10 minutes.

| Amount of Cumene Hydroperoxide per 100 pts. of rubber | Minutes Masticated at 300° F. | Tors. Hyst. |
|---|---|---|
| 1.17 | 4 | 0.0929 |
| 2.34 | 4 | 0.0734 |

From these data it can be seen that the ultimate torsional hysteresis of vulcanizates prepared in accordance with my invention depends both upon the amount of peroxide added and upon the duration of the heating step. Either by increasing the amount of cumene hydroperoxide beyond the 2.34 parts shown here or by prolonging the heating step beyond the ten minutes at 300° F. shown above one can obtain a further decrease in torsional hysteresis.

EXAMPLE 2

To 155 parts of a masterbatch of Hevea rubber, carbon black, and stearic acid prepared as in Example 1, there are added 1.67 parts of the organic peroxide ester, tertiary-butyl peroxybenzoate, by mixing the two together on the mill at a temperature between 150° and 200° F.

The mixture is then masticated on a hot mill at a temperature of 275° F. for 15 minutes.

The same experiment is repeated but employing 3.67 parts of tertiary-butyl peroxybenzoate.

After the heat treatment of the peroxide-containing masterbatches they are mixed with conventional rubber compounding ingredients and vulcanized as in Example 1 and the specific electrical resistivity and torsional hysteresis of the vulcanizates are measured with the following results:

| Parts of tertiary-butyl peroxybenzoate | $Log_{10}R$ | Tors. Hyst. at 280° F. |
|---|---|---|
| 1.67 | 13+ | 0.046 |
| 3.67 | 13+ | 0.046 |

These data show the effectiveness of an ester of an organic peroxy acid in facilitating the production of a low-hysteresis carbon black reinforced stock having a high electrical resistivity. They also show that increasing the amount of peroxide over that necessary to give a torsional hysteresis in the range 0.04 to 0.05 does not result in further decrease in hysteresis.

EXAMPLE 3

To 155 parts of a masterbatch of Hevea rubber, carbon black, and stearic acid prepared as in Example 1, there are added two parts of the organic peroxide 2,2-bis(tertiary-butylperoxy)butane by mixing the liquid peroxide and the masterbatch together on the mill at a temperature between 150° and 200° F.

The resulting peroxide-containing masterbatch is then divided into two portions. One portion is masticated on a hot mill at a temperature of 300° F. for ten minutes. The other portion is masticated at 300° F. for four minutes.

The same experiments are repeated but employing one part of the peroxide, the peroxide-containing mix again being divided into two portions and the heat-treating step being carried out by masticating the two mixes on the hot mill at 300° F. for ten and four minutes respectively.

After the heat treatment of the four mixes they are each mixed with conventional rubber compounding ingredients and vulcanized as in Example 1. The specific electrical resistivity and torsional hysteresis of the vulcanizates are measured with the following results:

| Parts of 2,2-bis(tertiary-butylperoxy)butane | Time Masticated at 300° F., min. | $Log_{10}R$ | Tors. Hyst. at 280° F. |
|---|---|---|---|
| 2 | 10 | 13+ | 0.0577 |
| 2 | 4 | 13+ | 0.0707 |
| 1 | 10 | 13+ | 0.0634 |
| 1 | 4 | 11.1 | 0.0914 |

Comparison of these data with the values obtained for the control in Example 1 demonstrates the effectiveness of 2,2-bis(tertiary-butylperoxy)butane as a chemical to promote the production of low-hysteresis carbon black reinforced vulcanized rubber stocks. As little as one part of the peroxide is effective to produce a vulcanizate having an electrical resistivity at least 4,000 times that of the control and a torsional hysteresis which is less than 55% of that of the control, when the duration of the heat processing step at 300° F. is only four minutes. Increasing the amount of the peroxide employed or increasing the duration of the heating step brings about further corresponding increases in electrical resistivity and decreases in the torsional hysteresis.

EXAMPLE 4

To 155 parts of a masterbatch of Hevea rubber, carbon black, stearic acid prepared as in Example 1, there are added 4.22 parts of the solid organic peroxide, lauroyl peroxide, by mixing the peroxide and the masterbatch together on the mill at a temperature between 150° and 180° F.

The resulting peroxide-containing masterbatch is then masticated on a hot mill at a temperature of 225-250° F. for five minutes.

After this heat-treating step the treated masterbatch is mixed with conventional rubber compounding ingredients and vulcanized as in Example 1. The specific electrical resistivity and torsional hysteresis of the vulcanizate are measured with the following results:

| Parts Lauroyl Peroxide | Time Masticated, min. | $Log_{10}R$ | Tors. Hyst. at 280° F. |
|---|---|---|---|
| 4.22 | 5 | 13+ | 0.055 |

EXAMPLE 5

The following table summarizes the results obtained by employing, in place of the peroxides previously shown, other organic peroxides which are also effective in promoting the production of carbon black reinforced rubber vulcanizates having high electrical resistivity and low hysteresis. In each case the temperature in the hot-milling step was between 275° and 325° F.

*Table 1*

| Peroxide | Parts Used per 100 pts. of Rubber | $Log_{10}R$ | Tors. Hyst. at 280° F. |
|---|---|---|---|
| t-butyl hydrogen peroxide | 2.34 | 10.5 | 0.088 |
| t-butyl peroxide | 2.26 | 8.5 | 0.110 |
| benzoyl peroxide | 2.4 | 11.5 | 0.081 |
| OO-(mono-t-butyl) peroxymaleate | 1.0 | 13+ | 0.077 |
| bis(p-chlorobenzoyl) peroxide | 3.2 | 10.0 | 0.089 |
| di-t-butyl diperoxyphthalate | 1.63 | 13+ | 0.078 |
| p-(t-butyl)-alpha,alphadimethylbenzyl hydrogen peroxide | 1.1 | 8.6 | 0.109 |
| p-methyl-alpha,alpha-dimethylbenzyl hydrogen peroxide | .9 | 9.3 | 0.114 |
| (Control) | none | 7.5 | 0.165 |

EXAMPLE 6

It is well-known that the electrical resistivity and torsional hysteresis of a carbon black reinforced vulcanized rubber produced by conventional processing will vary depending upon the amount of carbon black employed. The following table illustrates the results obtained by applying the process of my invention to a series of rubber mixes containing varying amounts of a medium processing channel black ("Spheron 6"). Masterbatches containing 100 parts of Hevea rubber, 5 parts of stearic acid, and the amount of carbon black indicated in column 1, were prepared as in Example 1. Each masterbatch was divided into several portions. To each portion there was added the amount of tertiary-butyl peroxybenzoate indicated in column 2, intimately incorporated with the masterbatch by milling on a two-roll mill at 150-200° F. Each mixture was then heat-treated by masticating it on the mill for five minutes at 300° F. Thereafter, the usual compounding ingredients were mixed in by milling and the mixes were vulcanized as in Example 1. The measured values of the electrical resistivity and torsional hysteresis of the vulcanizates are given in columns 3 and 4.

*Table 2*

| Pts. MPC Black per 100 of Rubber | Pts. t-butyl perbenzoate per 100 of Rubber | $Log_{10}R$ | Tors. Hyst. at 280° F. |
|---|---|---|---|
| *a—15 | None | 13+ | 0.058 |
| b—15 | 0.30 | 13+ | 0.040 |
| c—15 | 0.60 | 13+ | 0.041 |
| d—15 | 1.00 | 13+ | 0.039 |
| e—15 | 1.60 | 13+ | 0.039 |
| *f—30 | None | 9.57 | 0.107 |
| g—30 | 0.30 | 13+ | 0.060 |
| h—30 | 0.60 | 13+ | 0.048 |
| i—30 | 1.00 | 13+ | 0.043 |
| j—30 | 1.60 | 13+ | 0.042 |
| *k—50 | None | 6.72 | 0.196 |
| l—50 | 0.30 | 7.50 | 0.121 |
| m—50 | 0.60 | 9.95 | 0.098 |
| n—50 | 1.00 | 13+ | 0.057 |
| o—50 | 1.60 | 13+ | 0.048 |
| *p—75 | None | 5.70 | 0.307 |
| q—75 | 0.45 | 6.40 | 0.218 |
| r—75 | 0.90 | 6.95 | 0.139 |
| s—75 | 1.50 | 9.22 | 0.083 |
| t—75 | 2.40 | 11.04 | 0.066 |

Samples a, f, k and p (marked with an asterisk) are controls indicating the results obtained by carrying out the processing of the rubber carbon black mixes without any added peroxide. Comparison of the data for these samples with the data for the other samples demonstrates the effectiveness of my process in reducing the torsional hysteresis and increasing the electrical resistivity of rubber and carbon black stocks containing large or small amounts of carbon black.

EXAMPLE 7

It is also well-known that the hysteresis of carbon black vulcanizates varies with the type of carbon black used. When used at equal volume loadings some rubber-reinforcing blacks give vulcanizates having inherently higher torsional hysteresis than do other blacks. To demonstrate the effectiveness of my process in reducing the hysteresis of rubber vulcanizates reinforced with carbon blacks other than the medium processing channel blacks employed in Examples 1 to 6 inclusive, two masterbatches were prepared containing 100 parts of Hevea rubber, 5 parts of stearic acid, 5 parts of mineral rubber and 65.8 parts each of a representative furnace black. One masterbatch was prepared using 65.8 parts of a commercial high modulus furnace black known as "Philblack A," and the other was prepared using 65.8 parts of a commercial high abrasion furnace black known as "Philblack O." The masterbatches were prepared by masticating the rubber, stearic acid, mineral rubber and carbon black together in a Banbury internal mixer at a temperature between 200° F. and 250° F. until uniformly mixed. Thereafter each masterbatch was divided into two portions. To one portion of each masterbatch there was added 1.5 parts of t-butyl peroxybenzoate for each 100 parts of rubber. The peroxide was incorporated in the rubber and carbon black mix by masticating them together on a two-roll mill at temperatures between 150° F. and 200° F. The two mixes containing the added peroxide and the two mixes containing no added peroxide were then treated by masticating each in the Banbury mixer for ten minutes at 300° F. Thereafter, the usual compounding ingredients including sulfur, vulcanization accelerators, etc., were incorporated by masticating in the Banbury mixer at 250° F. The torsional hysteresis of the vulcanizates prepared from these mixes was measured. The vulcanizate prepared from the mix containing Philblack A which had been heat-treated in the presence of added peroxide had a torsional hysteresis of 0.088, compared to a value of 0.124 for the vulcanizate containing Philblack A heat-treated in the absence of added peroxide. Likewise, the vulcanizate prepared from the mix containing Philblack O which had been heat-treated in the presence of added peroxide had a torsional hysteresis of 0.064, compared to a value of 0.359 for the vulcanizate prepared from the same mix heat-treated in the absence of added peroxide.

EXAMPLE 8

To demonstrate the effectiveness of the present invention with synthetic rubber, two masterbatches were prepared containing 100 parts of GR–S synthetic rubber (a copolymer of 70–80% butadiene with 30 to 20% styrene), 50 parts of a medium processing channel black ("Spheron-6"), 6 parts of a hydrocarbon oil ("Paraflux"), and 1 part of stearic acid. Masterbatch A employed a "cold" GR–S made by emulsion-copolymerization of a butadiene and styrene at 41° F. Masterbatch B employed a standard GR–S made by emulsion-polymerization of the two monomers at 70–80° F. To each masterbatch, prepared in the same way as in Example 1, there were added two parts of t-butyl peroxybenzoate by milling the masterbatch and the peroxide together on a cold mill. Each mix was heat-treated by masticating it on a hot mill at temperatures between 300° and 310° F. for the times indicated in Table 3. Thereafter there were added, for every 157 parts of each masterbatch, 5 parts of zinc oxide, 1.5 parts of mercaptobenzothiazole, 0.5 parts of diphenyl guanidine, 0.35 part of antioxidant, and 2.5 parts of sulfur, by masticating together the heat-treated masterbatch and the compounding ingredients on a two-roll rubber mill at 150° to 200° F. The mixes were removed from the mill, placed in suitable molds and vulcanized by heating for 45 minutes at 287° F. The electrical resistivity and torsional hysteresis of the vulcanizates were measured, with the results given in Table 3.

Table 3

| Mix | Pts. t-butyl peroxybenzoate per 100 GR–S | Time, Mast. at 300° F., min. | Log$_{10}$R | Tors. Hyst. at 280° F. |
|---|---|---|---|---|
| Masterbatch A (Cold GR–S). | 2 | 20 | 13+ | 0.060 |
| Masterbatch B (Regular GR–S). | 2 | 13 | 13+ | 0.047 |

The processing of similar mixes by comparable methods but in the absence of a peroxide gives vulcanizates having much lower electrical resistivity, i. e., in the range log$_{10}$R=7 to 9, and much higher torsional hysteresis, i. e., in the range 0.150–0.200.

EXAMPLE 9

Example 8 was repeated with standard GR–S but employing 2.2 parts of cumene hydroperoxide in place of t-butyl peroxybenzoate. The heat-treating step was carried on for 13 minutes at 300–310° F. The log$_{10}$R of the vulcanizate was greater than 13 and the torsional hysteresis was 0.053.

EXAMPLE 10

There were prepared four masterbatches identical with those shown in Example 8 except that in two masterbatches (C and D, using "cold" GR–S and standard GR–S, respectively) a commercial high abrasion furnace black ("Philblack O") was substituted part-for-part for the medium processing channel black employed in Example 8; in the other two masterbatches (E and F, using "cold" GR–S and standard GR–S, respectively) a commercial easy processing channel black ("Wyex") was substituted part-for-part for the medium processing channel black used in Example 8. Each masterbatch was divided in two portions. To one portion of each masterbatch there were added, for every 100 parts of synthetic rubber, 2 parts of t-butyl peroxybenzoate by mixing them together on a cold mill at 150° to 200° F. Thereafter each masterbatch, including those containing no added peroxide, was heat-treated by masticating it at 275° F. in a Banbury internal mixer for 5 minutes. After the treated mix was removed from the Banbury the additional compounding ingredients as shown in Example 8 were added by mixing on a two-roll mill.

Samples were molded, vulcanized and tested as in Example 8 with the following results:

Table 4

| | Type GR–S | Type C Black | Pts. t-butyl peroxybenzoate per 100 pts. GR–S | Log$_{10}$R | Tors. Hyst. at 280° F. |
|---|---|---|---|---|---|
| *a—Masterbatch C | "Cold" | Philblack O | None | 6.97 | 0.132 |
| b—Masterbatch C | do | do | 2 | 13+ | 0.067 |
| *c—Masterbatch D | Standard | do | None | 4.58 | 0.139 |
| d—Masterbatch D | do | do | 2 | 13+ | 0.054 |
| *e—Masterbatch E | "Cold" | Wyex | None | 10.91 | 0.191 |
| f—Masterbatch E | do | do | 2 | 13+ | 0.074 |
| *g—Masterbatch F | Standard | do | None | 7.45 | 0.197 |
| h—Masterbatch F | do | do | 2 | 13+ | 0.056 |

Comparison of the data for the controls (marked with an asterisk) with the data for the vulcanizates prepared from mixes prepared in accordance with the present invention, i. e., by heating the synthetic rubber-carbon black mixture in the presence of added peroxide, demonstrates the effectiveness of this method in increasing the electrical resistivity and decreasing the hysteresis of the stock.

EXAMPLE 11

A mixture of Hevea and synthetic rubbers containing carbon black was prepared by mixing together on a cold mill 93 parts of a "cold" GR–S carbon black masterbatch consisting of 60 parts of "cold" GR–S and 33 parts of "Philblack-O," and 2.4 parts of stearic acid, 40 parts of smoked sheet and 17 parts of "Spheron 6." To this mixture, there was added 2 parts of cumene hydroperoxide, this being intimately incorporated by milling on a mill at 150°–200° F. The mix was treated by masticating in a Banbury mixer for ten minutes at 275° F. Thereafter the conventional rubber compounding ingredients were added as in Example 1 to the treated mix and samples were molded and vulcanized. The vulcanizate so prepared has a $\log_{10}R$ of 13+ and a torsional hysteresis at 280° F. of 0.08. This vulcanizate showed 32% better resistance to abrasion than the control.

EXAMPLE 12

A masterbatch of 100 parts of smoked sheet containing 100 parts of a medium processing channel black ("Spheron-6"), 10 parts of stearic acid, and 3 parts t-butyl peroxybenzoate, the peroxybenzoate having been incorporated at 150°–200° F., was masticated in a Banbury mixer for 5 minutes at 300° F. To 107 parts of this masterbatch was added 50 parts of smoked sheet, followed by the conventional rubber compounding ingredients, the entire mass being masticated at a temperature of 150°–200° F., and the stock was then mold-cured in the usual manner. The cured stock had a $\log_{10}R$ of 13+ and a torsional hysteresis at 280° F. of 0.050.

This example shows that the benefits of my invention can be obtained, though to a proportionately lower extent, by processing less than all of the rubber in the presence of the carbon black and organic peroxide in the manner of my invention and then commingling the balance of the rubber with the peroxide-processed stock.

EXAMPLE 13

A masterbatch containing 100 parts of "cold" GR–S, 55 parts of a furnace black ("Philblack O"), 17 parts of a channel black ("Spheron-6"), 2.4 parts of stearic acid, 6.9 parts of "Paraflux," and 2.5 parts of cumene hydroperoxide, in which the peroxide had been incorporated by mastication at 150°–200° F., was treated by masticating in a Banbury mixer for 5 minutes at 275° F. To this masterbatch was added 40 parts of smoked sheet and curing ingredients, viz., 3 parts of zinc oxide, 1.35 parts of antioxidants, 0.65 parts of 2-mercapto-benzothiazole, 0.2 part of diphenyl guanidine, and 1.9 parts of sulfur, these ingredients being incorporated by mastication at 150°–200° F. The stock was mold-cured for 45 minutes at 293° F. The stock has a $\log_{10}R$ of 13+ and a torsional hysteresis at 280° F. of 0.075. Abrasion resistance is 27% better than that of a stock which is identical except for omission of the cumene hydroperoxide.

EXAMPLE 14

The following example demonstrates the effectiveness of the process with a masterbatch of isoprene-styrene elastomeric copolymer and carbon black. An elastomeric copolymer containing 75 parts isoprene and 25 parts styrene was mixed with 55 parts of Philblack O. Cumene hydroperoxide (2.0 parts) was added at 150°–200° F. This mixture was heated in the Banbury mixer for 5 minutes at 270°–300° F. The vulcanizate from this stock had a torsional hysteresis of 0.100 and $\log_{10}R$ of 8.2. A control stock, treated in an identical manner, except that no cumene hydroperoxide was used, had a torsional hysteresis of .170 and $\log_{10}R$ of 4.5.

EXAMPLE 15

Two parts of cumene hydroperoxide was added to a masterbatch of "cold" GR–S (100 parts) and Philblack O (50 parts). The masterbatch was milled in a Banbury mixer until the temperature reached 285° F. The rotor was then stopped for 5 minutes, after which time the stock was dumped from the Banbury, shaped and vulcanized. The vulcanizate had a torsional hysteresis of 0.122 and $\log_{10}R$ of 13.0+. Another stock, treated in an identical manner, except that the Banbury rotor was not stopped during the heat treatment, gave a vulcanizate with a torsional hysteresis of 0.116, and $\log_{10}R$ of 13.0+.

EXAMPLE 16

The following example illustrates the effectiveness of peroxides in reducing the time required for preparing low hysteresis stocks under static conditions. To a masterbatch of 38.5 parts of an easy processing channel black (Wyex) and 100 parts natural rubber was added on a mill at 150–200°, 1.5 parts cumene hydroperoxide. The mixture was heated for 15 minutes in steam at 290° F. The vulcanizate had $\log_{10}R=13.0+$, and a torsional hysteresis of 0.042. When 1.0 parts tertiary-butyl peroxybenzoate were used instead of cumene hydroperoxide, the vulcanizate had $\log_{10}R=13.0+$ and torsional hysteresis of 0.041. A similar stock, containing no peroxide, it was necessary to heat the mixture for three hours or longer at 310° to obtain a vulcanizate with $\log_{10}R=13.0$ and torsional hysteresis of 0.051.

EXAMPLE 17

To a masterbatch of "cold" GR–S containing 50 parts Spheron-6 was mixed 2.5 parts of a 50% solution of diisopropylbenzene hydroperoxide. The stock was heated in steam for 20 minutes at 290° F. The stock, after vulcanization, had $\log_{10}R=13.0$ and torsional hysteresis of 0.090. An identical stock, except that it contained no peroxide, was heated in an identical manner. After vulcanization, it had $\log_{10}R=8.3$ and torsional hysteresis of 0.185.

EXAMPLE 18

1.5 parts t-butyl peroxybenzoate was added to a masterbatch of 50 parts of Spheron-6 and 100 parts of a copolymer of about 75% butadiene and 25% acrylonitrile. The stock was heated 8 minutes in a Banbury mixer at 270° F. The stock, after vulcanization with 5 parts zinc oxide, 2.5 parts stearic acid, 1 part 2-mercaptobenzothiazyl disulfide, 0.2 part dibutyl amine, and 1.2 parts sulfur, had a torsional hysteresis of 0.095. A similar stock, containing no peroxide, was heated in an identical manner. After vulcanization, it had a torsional hysteresis of 0.150.

From the foregoing it will be seen that the process of my invention presents many advantages, chief among which is that low-hysteresis processing of rubber and carbon black mixtures is considerably expedited by the use of my organic peroxide promoters, thereby correspondingly increasing the production from given equipment. Another advantage is that the benefits achieved by the use of my organic peroxide promoters far outweigh the cost of their use in my invention. Another advantage is that my invention can be practiced with equipment and methods which are well-known to the rubber manufacturing art. Another advantage is that the use of the organic peroxide in accordance with my invention does not adversely affect the properties of the vulcanizate. Many other advantages of my invention will be apparent to those skilled in the art.

Having thus described my invention, what I claim and desire to protect by Letters Patent is:

1. A method of manufacturing rubber products having low torsional hysteresis and high electrical resistivity which comprises incorporating in a well-blended mixture of conjugated diene polymer rubber and a rubber-reinforcing carbon black an organic peroxide which decomposes in not over 20 minutes in the range of temperatures from 200° F. to 350° F., at a temperature insufficiently elevated to thermally decompose said peroxide, subsequently heat-treating the mixture at a temperature sufficiently elevated that said peroxide is thermally decomposed but insufficiently elevated to substantially injure the properties of the rubber, continuing said heat-treating for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcanizing the resulting shaped mass.

2. The method of claim 1 wherein said heat-treating is carried out at a temperature of from 250° to 325° F.

3. A method of manufacturing rubber products having low torsional hysteresis and high electrical resistivity which comprises incorporating in a uniform mixture of conjugated diene polymer rubber and a rubber-reinforcing carbon black an organic peroxide, which decomposes in not over 20 minutes in the range of temperatures from 200° F. to 350° F., at a temperature insufficiently elevated to thermally decompose said peroxide, subsequently masticating the mixture at a temperature sufficiently elevated that said peroxide is thermally decomposed but insufficiently elevated to substantially injure the properties of the rubber, and continuing said mastication for a time sufficient to substantially lower the torsional hysteresis and substantially increase the electrical resistivity of a vulcanizate of the resulting mixture.

4. A method of manufacturing rubber products having low torsional hysteresis and high electrical conductivity which comprises mixing conjugated diene polymer rubber uniformly with at least 25 parts of a rubber-reinforcing carbon black per 100 parts of rubber and thereafter with a small amount of an organic peroxide which decomposes in not over 20 minutes in the range of temperatures from 200° F. to 350° F., heating the resulting mixture at a temperature of from 250° to 325° F. for a time sufficient to substantially lower the torsional hysteresis and substantially increase the electrical resistivity of a vulcanizate of the resulting mixture, and thereafter masticating the mixture and completing incorporation of vulcanizing and other desired ingredients.

5. A method of manufacturing rubber products having low torsional hysteresis and high electrical resistivity which comprises incorporating in a well-mixed blend of conjugated diene polymer rubber and from 25 to 100 parts of a rubber-reinforcing carbon black per 100 parts of said rubber, an organic peroxide in an amount which contains from 0.02 to 0.4 parts of active oxygen per 100 parts of rubber, said peroxide being one which decomposes in not over 20 minutes in the range of temperatures from 200° F. to 350° F., the temperature of incorporation being insufficiently elevated to thermally decompose said peroxide, subsequently heat-treating the mixture at a temperature sufficiently elevated that said peroxide is thermally decomposed but insufficiently elevated to substantially injure the properties of the rubber, continuing said heat-treating for a time sufficient to substantially lower the torsional hysteresis and substantially increase the electrical resistivity of a vulcanizate of the resulting mixture, masticating the mixture and completing the incorporation of vulcanizing and other desired ingredients, shaping the resulting mixture, and vulcanizing the shaped mixture.

6. A method of manufacturing rubber products having low torsional hysteresis and high electrical resistivity which comprises incorporating in a well-mixed blend of conjugated diene polymer rubber and a rubber-reinforcing carbon black cumene hydroperoxide, at a temperature insufficiently elevated to thermally decompose said peroxide, heat-treating the mixture at a temperature of from 250° to 325° F., continuing said heat-treating step for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcanizing the resulting shaped mass.

7. The method of claim 6 wherein the amount of said cumene hydroperoxide contains from 0.02 to 0.40 part of active oxygen per 100 parts of said rubber.

8. A method of manufacturing rubber products having low torsional hysteresis and high electrical resistivity which comprises incorporating in a well-mixed blend of conjugated diene polymer rubber and a rubber-reinforcing carbon black tertiary-butyl peroxybenzoate, at a temperature insufficiently elevated to thermally decompose said peroxybenzoate, subsequently heat-treating the mixture at a temperature of from 250° to 325° F., continuing said heat-treating step for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcanizing the resulting shaped mass.

9. The method of claim 8 wherein the amount of said t-butyl peroxybenzoate contains from 0.02 to 0.40 part of active oxygen per 100 parts of said rubber.

10. A method of manufacturing rubber products having low torsional hysteresis and high electrical resistivity which comprises incorporating in a well-mixed blend of conjugated diene polymer rubber and a rubber-reinforcing carbon black, 2,2-bis-(tertiary-butylperoxy)butane, at a temperature insufficiently elevated to thermally decompose said 2,2-bis-(tertiary-butylperoxy)-butane, subsequently heat-treating the mixture at a temperature of from 250° to 325° F., continuing said heat-treating step for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcanizing the resulting shaped mass.

11. The method of claim 10 wherein the amount of said 2,2-bis(tertiary-butylperoxy)butane contains from 0.02 to 0.40 part of active oxygen per 100 parts of said rubber.

12. A method of manufacturing rubber products having low torsional hysteresis and high electrical resistivity which comprises incorporating in a well-mixed blend of conjugated diene polymer rubber and a rubber-reinforcing carbon black para-methyl-alpha,alpha-dimethylbenzyl hydrogen peroxide, at a temperature insufficiently elevated to thermally decompose said para-methyl - alpha,alpha - dimethylbenzyl hydrogen peroxide, subsequently heat-treating the mixture at a temperature of from 250° to 325° F., continuing said heat-treating step for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcanizing the resulting shaped mass.

13. The method of claim 12 wherein the amount of said para-methyl-alpha,alpha-dimethylbenzyl hydrogen peroxide contains from 0.02 to 0.40 part of active oxygen per 100 parts of said rubber.

14. A method of manufacturing rubber products having low torsional hysteresis and high electrical resistivity which comprises incorporating in a well-mixed blend of conjugated diene polymer rubber and a rubber-reinforcing carbon black diisopropylbenzene hydroperoxide, at a temperature insufficiently elevated to thermally decompose said diisopropylbenzene hydroperoxide, subsequently heat-treating the mixture at a temperature of from 250° to 325° F., continuing said heat-treating step for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcanizing the resulting shaped mass.

15. The method of claim 14 wherein the amount of said diisopropylbenzene hydroperoxide contains from 0.02 to 0.40 part of active oxygen per 100 parts of said rubber.

16. The method which comprises heat-treating an intimate mixture of conjugated diene polymer rubber, a rubber-reinforcing carbon black, and an organic peroxide which decomposes in not over 20 minutes in the range of temperatures from 200° F. to 350° F., at a temperature sufficiently elevated that said peroxide is thermally decomposed but insufficiently elevated to substantially injure the properties of the rubber, for a time sufficient to substantially lower the torsional hysteresis of a vulcanizate of the resulting mixture, masticating the mixture and completing the incorporation of vulcanizing and other desired ingredients, shaping the mass, and vulcanizing the resulting shaped mass.

17. The method which comprises heat-treating an intimate mixture of conjugated diene polymer rubber, a rubber-reinforcing carbon black, and an organic peroxide which decomposes in not over 20 minutes in the range of temperatures from 200° F. to 350° F., at a temperature sufficiently elevated that said peroxide is thermally decomposed but insufficiently elevated to substantially injure the properties of the rubber, for a time sufficient to substantially increase the electrical resistivity of a vulcanizate of the resulting mixture, masticating the mixture and completing the incorporation of vulcanizing and other desired ingredients, shaping the mass, and vulcanizing the resulting shaped mass.

References Cited in the file of this patent

UNITED STATES PATENTS

| Number | Name | Date |
| --- | --- | --- |
| 2,118,601 | Gerke et al. | May 24, 1938 |
| 2,199,099 | Cunningham | Apr. 30, 1940 |

OTHER REFERENCES

Farmer, Transactions of the Institution of the Rubber Industry, 21, 122 (1946).